United States Patent [19]

Scofield

[11] 3,987,764

[45] Oct. 26, 1976

[54] TIMER MEANS FOR SEQUENTIAL FUEL INJECTION

[75] Inventor: Bruce A. Scofield, Fort Wayne, Ind.

[73] Assignee: International Harvester Company, Chicago, Ill.

[22] Filed: July 11, 1975

[21] Appl. No.: 596,025

Related U.S. Application Data

[63] Continuation of Ser. No. 517,974, Oct. 25, 1974, abandoned, which is a continuation of Ser. No. 265,004, June 21, 1972, abandoned.

[52] U.S. Cl. ................... 123/32 EA; 123/146.5 A
[51] Int. Cl.² .................................... F02B 3/00
[58] Field of Search ............... 123/32 EA, 146.5 A

[56]         References Cited
            UNITED STATES PATENTS

| | | | |
|---|---|---|---|
| 3,448,728 | 6/1969 | Scholl | 123/32 EA |
| 3,456,628 | 7/1969 | Bassot | 123/32 EA |
| 3,464,396 | 9/1969 | Scholl | 123/32 EA |
| 3,653,365 | 4/1972 | Monpetit | 123/32 EA |
| 3,660,689 | 5/1972 | Oishi | 123/32 EA |
| 3,688,750 | 9/1972 | O'Neill | 123/32 EA |
| 3,710,766 | 1/1973 | Beishir | 123/32 EA |
| 3,734,068 | 5/1973 | Reddy | 123/32 EA |
| 3,749,070 | 7/1973 | Oishi | 123/32 EA |
| 3,750,631 | 8/1973 | Scoll et al | 123/32 EA |
| 3,757,755 | 9/1973 | Carner | 123/32 EA |

*Primary Examiner*—Charles J. Myhre
*Assistant Examiner*—Paul Devinsky
*Attorney, Agent, or Firm*—Frederick J. Krubel; Floyd B. Harman

[57]          ABSTRACT

Timer means for sequential fuel injection including a timer circuit triggered to develop an output signal after a time interval having a duration which varies as a linear function of the magnitude of one or more control voltages varied in accordance with operating parameters, one control voltage being preferably a conditioned speed signal and a second being preferably a conditioned intake manifold pressure signal. The voltage across capacitor means is varied as a linear function of a control voltage, using either a Miller ramp circuit or using a transistorized current sink and is applied to a triggering circuit in the form of a Schmitt trigger circuit or a dual input operation amplifier.

6 Claims, 9 Drawing Figures

TIMER MEANS FOR SEQUENTIAL FUEL INJECTION

This is a continuation of application Ser. No. 517,974 now abandoned, filed Oct. 25, 1974 which is a continuation of Ser. No. 765,004, June 21, 1972, abandoned.

This invention relates to timer means for sequential fuel injection and more particularly to timer means operative to obtain injection of the optimum amount of fuel under all operating conditions with a high degree of accuracy. The timer means uses circuitry which is relatively simple in configuration and operation and which is economically feasible while being highly reliable.

BACKGROUND OF THE INVENTION

Sequential fuel injection systems have heretofore been proposed using one electrically operated valve for each cylinder to allow flow of a controlled amount of fuel during each intake stroke with the amount of fuel being controlled by controlling the duration of electrical pulses applied through distributor means to allocate the application of the pulses to the injector valves in accordance with the firing order of the engine. Such systems have not been entirely satisfactory with respect to construction, operation and reliability. For example, timing means for controlling the duration of opening of the injector valve means have generally included multivibrator means responsive to one or more control signals the magnitude of which are controlled by variations in operating parameters such as speed, intake mainfold pressure, etc. The injector valve opening time is a function of the magnitude of the control signals, the function being non-linear and being subject to variations with variations in the characteristics of components in the multivibrator circuitry. As a result, complexities have been introduced with respect to the generation of the control signals and, in addition, very close tolerances must be maintained to obtain uniform and reliable performance.

SUMMARY OF THE INVENTION

This invention was evolved with the general object of overcoming the disadvantages of prior art systems and of providing a system which is readily and economically manufacturable and in which uniformly accurate control is obtained with a high degree of reliability.

A more specific object of the invention is to provide a sequential fuel injection system incorporating timer circuitry so constructed and operating as to simplify the design and construction of other components of the system while obtaining highly accurate and reproducable results.

In accordance with this invention, a timer circuit is provided which is controlled by control voltage and in response to a triggering signal to develop an output signal after a time interval having a duration which varies as a linear function of the magnitude of at least one of the control voltages, which is varied in accordance with an engine operating parameter. An injector valve is opened in predetermined phase relation to the triggering signal and is closed in response to the timer circuit output signal, the time of opening of the valve and hence the amount of fuel supplied being thereby a linear function of the control voltage.

This arrangement has important advantages and particularly with respect to the attainment of injection of an optimum amount of fuel during variations in operating conditions. In general, the optimum amount of fuel does not vary as a linear function of any operating parameter, and for example it varies as a non-linear function of speed and as a non-linear function of intake manifold pressure. Such non-linear functions must be taken into account and satisfied in the design of computer or signal conditioning circuitry in the control voltage supply means, which must be relatively complex to satisfy the requirements. If the timer circuitry has a non-linear response, additional complexities are introduced into the design of the computer or signal conditioning circuitry, making accurate control very difficult. By using the timer circuit which has a linear response characteristic, such additional complexities are obviated.

In one embodiment, only one control voltage is controlled in response to variations in operating parameters and a second control voltage is adjustably fixable to determine the ratio between the one control voltage and the duration of the timing interval. In another, two control voltages are varied in response to different parameters such as speed and intake manifold pressure, for example, the duration of the timing interval being a linear function of each of the control voltages. Thus, the timer circuit performs a multiplication function on a linear basis. This feature further simplifies the design of the computer or signal conditioning circuitry, eliminating the need for a separation multiplication operation and eliminating circuitry which would otherwise be required.

In accordance with a specific feature, the timer circuit includes capacitance means, the voltage thereacross being fixed in response to a triggering signal and being changed at a linear rate proportional to the magnitude of a first control voltage and a trigger circuit is triggered from one state to another to develop the timer output signal when the voltage across the capacitance means reaches a certain level controlled by the magnitude of the second control voltage.

In accordance with further specific features, a Miller linear ramp circuit configuration may be used to provide the capacitance charge control means or the capacitance means may be charged to a fixed value and discharged through a current sink including transistor means so controlled as to obtain a uniform controllable flow of current. The trigger means may be in the form of a Schmitt trigger or in the form of an operational amplifier having a dual input, the voltage from the capacitance means being applied to one input and the control voltage being applied to the other.

This invention contemplates other objects, features and advantages which will become more fully apparent from the following detailed description taken in conjunction with the accompanying drawings.

Figure 1:
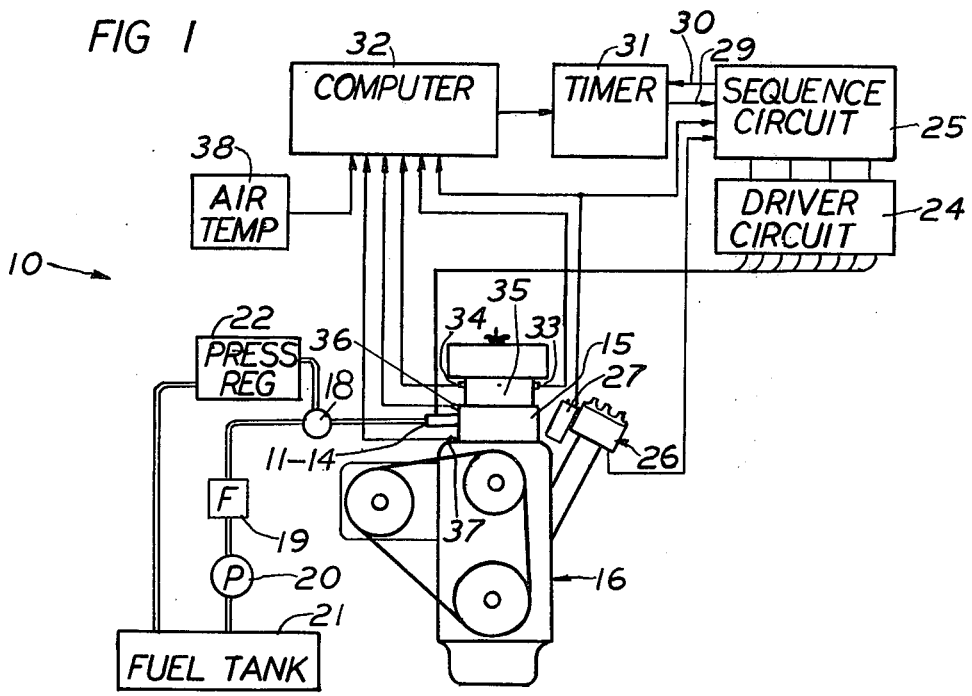
FIG. 1 is a schematic diagram of a sequential fuel injection system for a four cylinder engine, incorporating timer circuitry according to the invention.

Reference numeral 10 generally designates a sequential fuel injection system designed for a four cylinder engine, incorporating timer means constructed in accordance with the principles of the invention. An individual solenoid-operated injection nozzle or valve is provided for each cylinder of an engine and each valve is opened once during every revolution of the engine cam shaft, or once during every other revolution of the drive shaft, in the case of a four cycle engine. In the system 10, designed for a four-cylinder engine, there are four injection valves, 11-14, FIG. 2, which may be mounted on an intake manifold 15 of an engine 16 in the manner as shown diagrammatically in FIG. 1. As also shown in FIG. 1, the injection valves are connected to a header 18 which is connected through a filter 19 to the outlet of a pump 20 having an inlet connected to a fuel tank 21. A pressure regulator 22 is provided between the header 18 and the fuel tank 21 to maintain the pressure in the header at a substantially constant value which may be on the order of 40 PSIG, by way of example.

The injection valves 11-14 are connected to a driver circuit 24 controlled from a sequence circuit 25. In accordance with the invention, the sequence circuit 25 receives control or reset and triggering or index signals from a distributor 26 and an ignition coil 27 of the engine and controls the time intervals in which the valves 11-14 may be energized, to synchronize the injection of fuel in relation to the intake strokes of the respective cylinders. The sequence circuit 25 is also connected through lines 29 and 30 to a timer 31 which is controlled from a computer 32.

Computer 32 controls the timer 31 and through the sequence and driver circuits 25 and 24, the time duration of each opening of each injection valve is controlled, the control being a function of the prevailing operating conditions at the time of injection. In the illustrated arrangement, the computer 32 receives pulses from the ignition coil 27 to develop a speed signal and is connected to switches 33 and 34 mounted on a throttle 35 of the engine 16, switch 33 being operated when the throttle is closed and switch 34 being operated when the throttle is wide open. Computer 32 is also connected to a sensor 36 which senses intake manifold absolute pressure, to a sensor 37 which senses coolant temperature and to a sensor 38 which senses air temperature, as diagrammatically illustrated. The computer 32 may also contain circuitry for sensing acceleration and also the rate of change of intake manifold absolute pressure. In response to such sensed operating conditions, the computer 32 may develop an analog voltage output which controls the duration of a pulse generated by timer 31 and applied to the sequence circuit through line 29, the beginning of each pulse being determined by a triggering signal applied through line 30. By way of example, the duration of the timing signal or pulse may typically be on the order of from 2 to 12 milliseconds.

Figure 2:
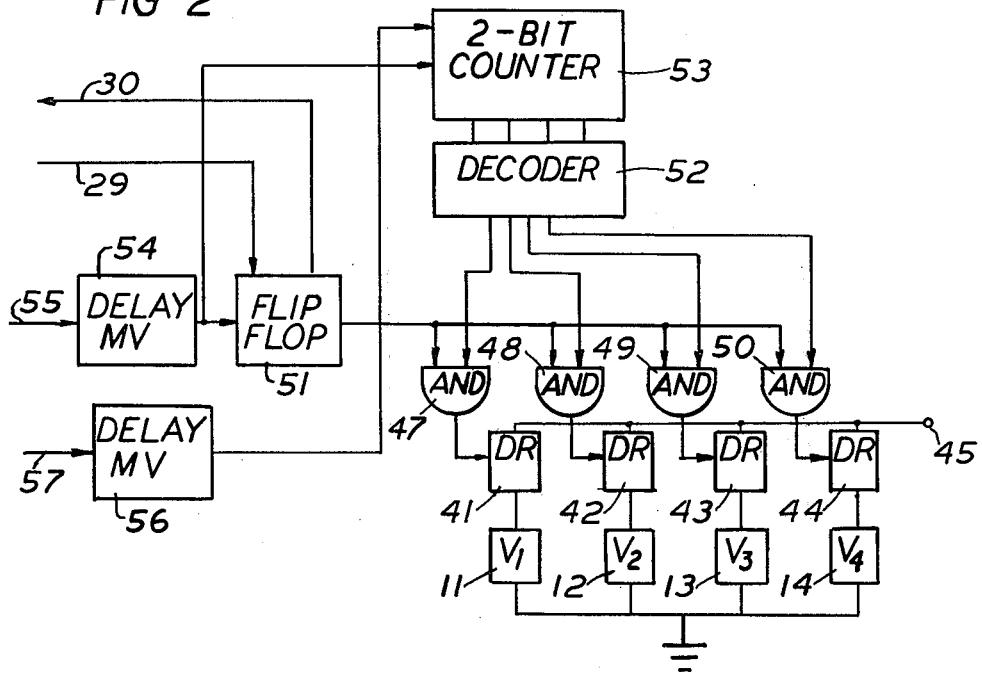
FIG. 2 is a block diagram of sequence and drive circuits of the system of FIG. 1.

Referring now to FIG. 2, the solenoids of the injection valves 11-14 are connected between ground and outputs of four driver stages 41-44 connected to a power supply terminal 45 to which battery voltage of on the order of 12 volts may be supplied. Inputs of the driver stages 41-44 are connected to the outputs of four AND gates 47-50 having inputs connected together into the output of a flip-flop 51 and having additional inputs connected through a decoder 52 to outputs of a two-bit counter 53. Inputs of the flip-flop 51 and of the counter 53 are connected to the output of a delay monostable multivibrator 54 having an input connected through a line 55 to the ignition coil 27. An additional input of the counter 53 is connected to the output of a second monostable delay multivibrator 56 having an input connected through a line 57 to the distributor 26.

In the general operation of the system, index signals responsive to ignition pulses are applied through the delay multivibrator 54 to the counter 53 to advance the count thereof and also the flip-flop 51 which is then placed in a set condition, a signal being then applied through line 30 to the timer 31 to initiate operation thereof. Timer 31 then generates a pulse of controlled length at the termination of which a signal on line 29 resets the flip-flop 51. When the flip-flop 51 is set, a signal is applied through one of the AND gates 47-50, depending upon the condition of the counter 52, to one of the driver stages 41-44, to energize one of the injection valves 11-44 for a time interval corresponding to the timing pulse applied from the timer 31. The reset signal applied from the distributor 26 through the delay multivibrator 56 to the counter 53 is for the purpose of correlating the operation of the counter 53 to the firing sequence of the engine.

Figure 3:
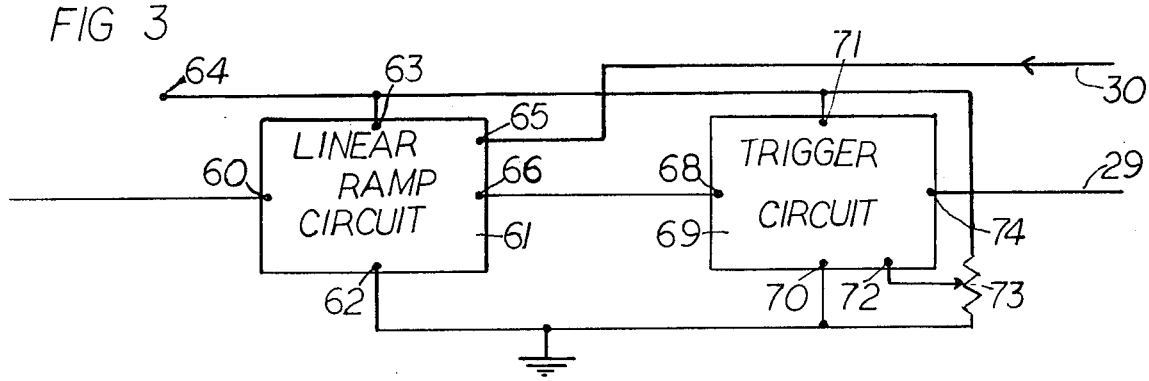
FIG. 3 is a block diagram of one form of timer circuit usable in the system of FIG. 1.

FIG. 3 illustrates one form of the timer circuit 31. A control voltage from the computer 32 is applied to an input terminal 60 of a linear ramp circuit 61 which has terminals 62 and 63 respectively connected to ground and to a power supply terminal 64, a trigger input terminal 65 connected to the line 30 and an output terminal 66. When a trigger signal is applied through line 30 to the terminal 65, the ramp circuit 61 generates an output signal at the terminal 66 which increases linearly with time, at a rate proportional to the control voltage applied to terminal 60 from the computer 32.

The linear ramp signal so generated that the terminal 66 is applied to an input terminal 68 of a trigger circuit 69 which has terminals 70 and 71 respectively connected to ground and to the power supply terminal 64, a control voltage input terminal 72 connected to the adjustable contact of a potentiometer 73 which is connected between ground and the terminal 64, and an output terminal 74 which is connected through the line 29 to the flip-flop 51.

When the increasing ramp voltage applied to the input terminal 68 of the trigger circuit 69 reaches a certain level, determined by the control voltage applied to terminals 72 from the potentiometer 73, the trigger circuit 69 is triggered from one state to another to generate an output signal at the terminal 74 which is applied through the line 29 to the flip-flop 51 and to effect closing of one of the valves 11-14.

With this arrangement, the time interval during which the injector valve is open is inversely proportional to the control voltage applied to the input terminal 60 of the linear ramp circuit 61.

Figure 4:
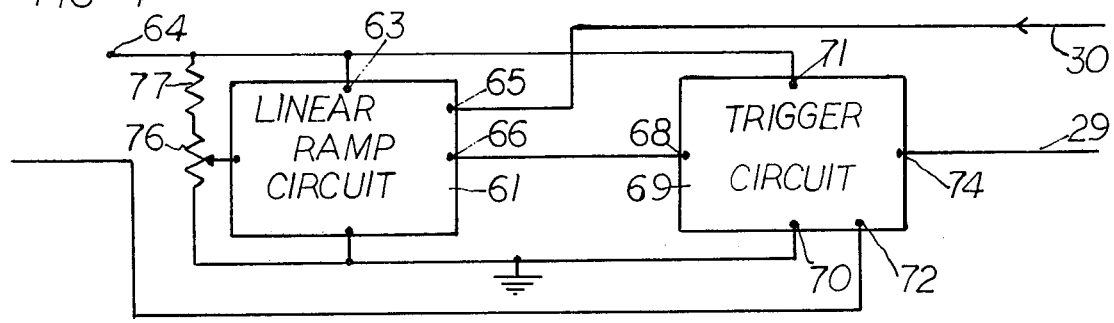
FIG. 4 is a block diagram of another form of timer circuit usable in the system of FIG. 1.

FIG. 4 illustrates a modified timer circuit in which the control voltage from the computer 32 is applied to the terminal 72 of the trigger circuit 69 and in which the control voltage input terminal 60 of the linear ramp circuit 61 is connected to the adjustable contact of a potentiometer 76 having one terminal connected to ground and the opposite terminal connected through a resistor 77 to the power supply terminal 64. In operation, the linear ramp circuit 61, in response to a triggering signal applied to terminal 65 through line 30, generates an increasing voltage at the output terminal 66, the voltage increasing linearly with time at a rate proportional to the control voltage determined by the position of adjustment of the potentiometer 76. When the increasing ramp voltage, which is applied to the input terminal 68 of the trigger circuit 69, reaches a certain level dependent upon the magnitude of the control voltage applied to terminal 72, the trigger circuit 69 is triggered from one state to another, generating an output signal at the terminal 74 which is applied through line 29 to the flip-flop 51 to reset the flip-flop 51 and to close one of the valves 11–14. Here again, the duration of the timer interval during which the injector valve is open is directly proportional to the control voltage applied from the computer. Because of the linear operation, the computer 32 does not have to be designed to take into account any non-linearities in the operation of the timer and needs only to compensate for non-linearities in the relationship between the optimum fuel flow and the operating parameters such as speed, intake manifold pressure, etc.

Figure 5:
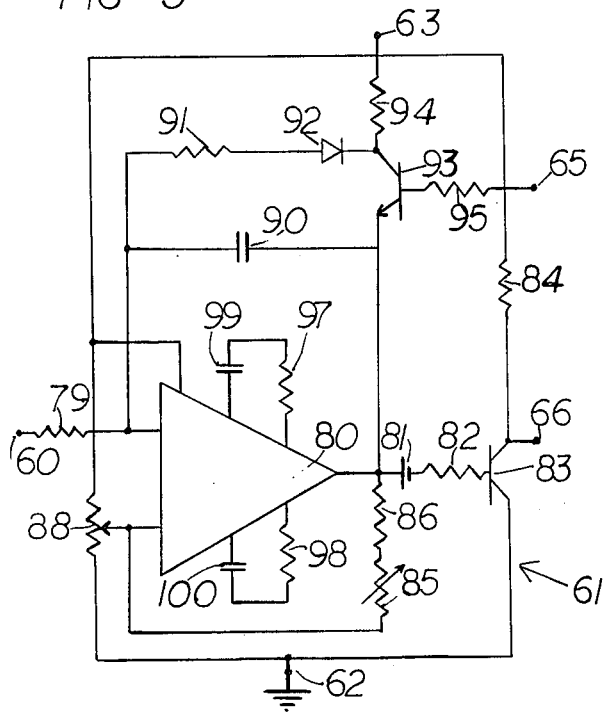
FIG. 5 is a circuit diagram of a linear ramp circuit usable in the circuits of FIGS. 3 and 4.

FIG. 5 is a circuit diagram of the linear ramp circuit 61. The control voltage input terminal 60 is connected through a resistor 79 to one input terminal of an operational amplifier 80 having an output terminal connected through a bias cell 81 and a resistor 82 to the base of a transistor 83 having a grounded emitter and having a collector connected to the output terminal 66 and through a resistor 84 to the supply terminal 63. A second input terminal of the amplifier 80 is connected through an adjustable resistor 85 in a fixed resistor 86 to the output terminal thereof and is also connected to the movable contact of a potentiometer 88 connected between ground and the supply terminal 63. A capacitor 90 is connected between the output terminal of amplifier 80 and the first input terminal thereof, the left-hand terminal of capacitor 90 being connected through a resistor 91 and a diode 92 to the collector of a transistor 93 having an emitter connected to the right-hand terminal of the capacitor 90. The collector of transistor 93 is connected through a resistor 94 to the supply terminal 63 and the base of the transistor 93 is connected through a resistor 95 to the trigger signal input terminal 65. Amplifier 80 is an integrated circuit amplifier, an RCA type CA-3010, for example, with external resistors 97 and 98 and capacitors 99 and 100 connected thereto.

In operation, the signal applied from flip-flop 51 through line 30 to terminal 65 is normally at a high potential, maintaining a transistor 93 conductive and holding the output of the amplifier 80 at a high level, with the capacitor 90 being either substantially discharged or being charged with the right-hand terminal thereof positive, according to any difference in the positive potential of the emitter of transistor 93 relative to the control voltage input terminal 60.

When the signal applied from flip-flop 51 through line 30 to terminal 65 goes in a negative direction, toward ground potential, the ramp circuit is triggered into operation and it then operates as a Miller ramp circuit, capacitor 90 being charged or having its charge changed at a linear rate under control of the amplifier 80 and the output of the amplifier 80 being reduced gradually at a linear rate. The rate may, of course, be controlled by adjustment of the resistor 85 and potentiometer 88. Transistor 83 operates as an inverter the output signal at the terminal 66 being initially at a value close to ground potential, but being increased at a linear rate as the potential of the output of the amplifier 80 drops at a linear rate.

Figure 6:
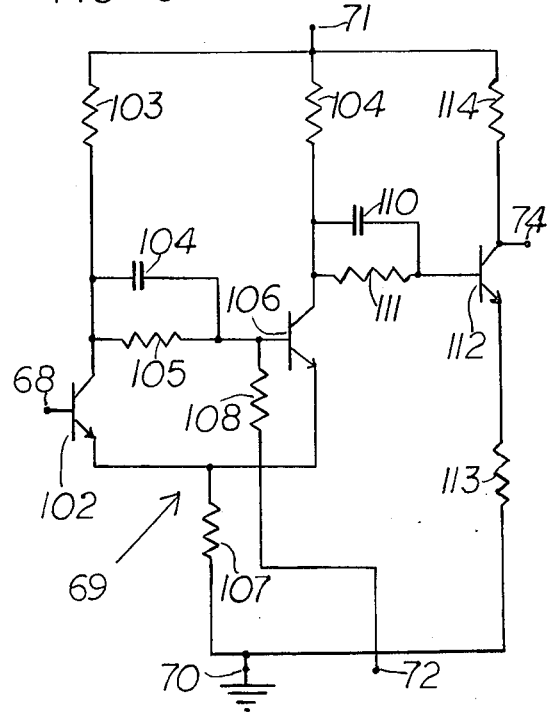
FIG. 6 is a circuit diagram of a trigger circuit usable in the circuits of FIGS. 3 and 4.

FIG. 6 is a circuit diagram of the trigger circuit 69. The input terminal 68 is connected to the base of a transistor 102 having a collector connected through a resistor 103 to the supply terminal 71 and also connected through the parallel combination of a capacitor 104 and a resistor 105 to the base of a transistor 106, the emitters of the transistors 102 and 106 being connected through a resistor 107 to the grounded terminal 70. The base of the transistor 106 is connected through a resistor 108 to the control voltage input terminal 72 and the collector of the transistor 106 is connected through a resistor 109 to the supply terminal 71 and also through the parallel combination of a capacitor 110 and a resistor 111 to the base of a transistor 112. The emitter of the transistor 112 is connected through a resistor 113 to ground and the collector thereof is connected to the output terminal 74 and also through a resistor 114 to the supply terminal 71.

In operation, the transistor 102 is normally nonconductive while the transistor 106 is conductive and the transistor 112 is non-conductive, placing the output terminal 74 at a potential approximately equal to that of the supply terminal 71. The emitters of the transistors 102 and 106 are normally at a positive potential determined by the control voltage applied from terminal 72 through resistor 108 to the base of the transistor 106. When the increasing ramp voltage applied to the control voltage input terminal 68 exceeds the potential of the emitters, determined by the level of the control voltage applied to the terminal 72, the transistor 102 starts to conduct decreasing the potential of its collector and thereby the potential of the base of the transistor 106 and through the common connection of the emitters of the two transistors through the resistor 107 to ground, the circuit is rapidly switched to a condition in which the transistor 102 conducts heavily while the transistor 106 is cut off. With transistor 106 cut off, the transistor 112 conducts, causing its collector to go negative to a potential approaching ground potential. The negative-going signal so developed at the output terminal 74 is applied to the flip-flop 51 to reset the flip-flop 51 and to effect closing of one of the valves 11–14. It will be appreciated that the circuit 69 is thus operative as a Schmitt trigger.

Figure 7:
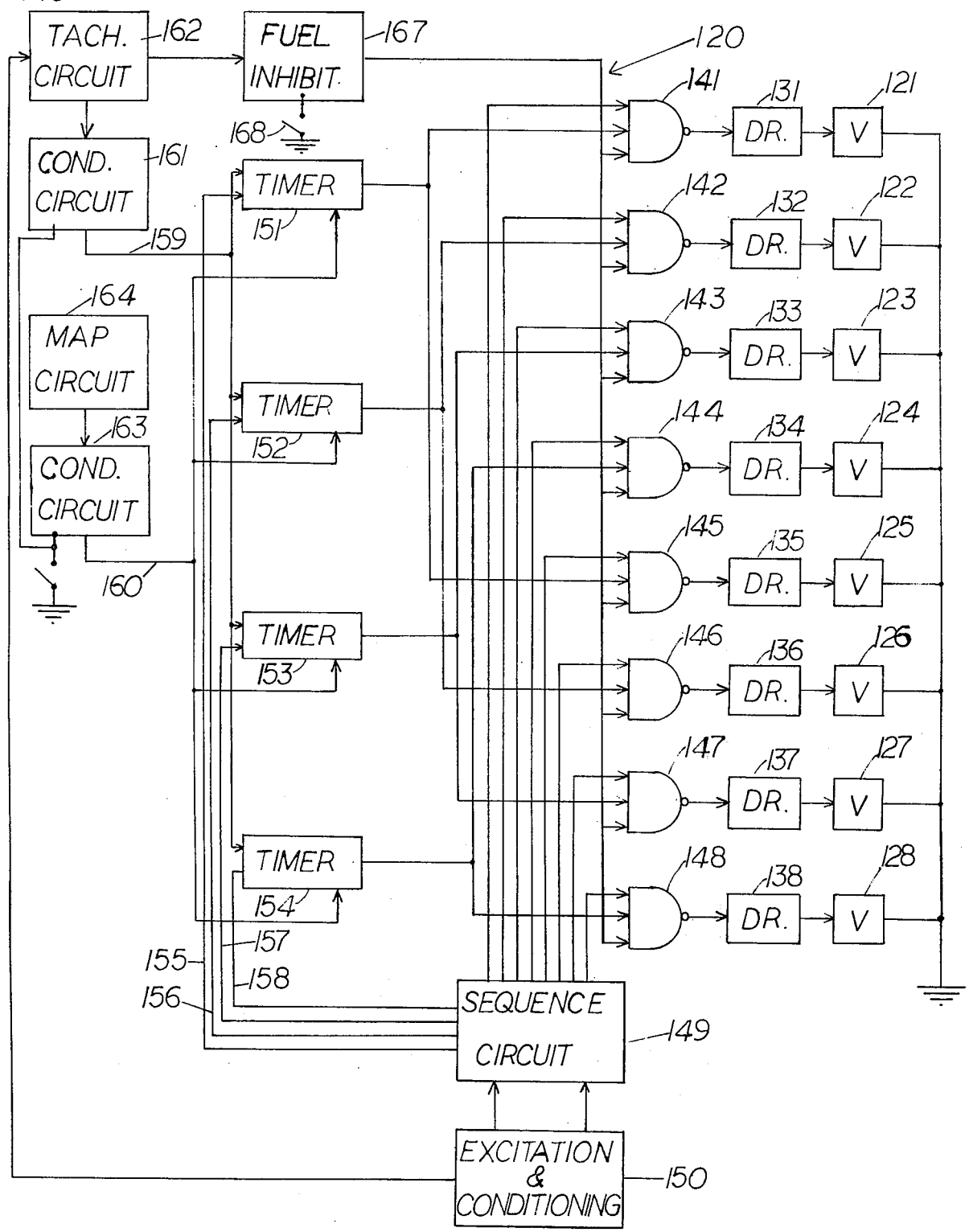
FIG. 7 is a schematic diagram of a sequential fuel injection system for an eight cylinder engine, incorporating timer circuitry according to the invention.

Referring to FIG. 7, reference numeral 120 generally designates a sequential fuel injection system for an eight cylinder engine, incorporating timer circuitry according to the invention. In the system 120, eight injector valves 121–128 are connected between ground and the outputs of eight driver stages 131–138 having inputs connected to outputs of eight NAND gates 141–148. Inputs of the gates 141–148 are connected to outputs of a sequence circuit 149 to which index and reset signals are applied from an exitation and conditioning circuit 150, the sequence circuit 149 being operative to supply signals to the gates 141–148 in synchronized relation to the operation of the engine, to control the times during which the injector valves 121–128 may be opened.

In the system 120, four timers 151–154 are employed, the timer 151 being connected to inputs of gates 141 and 145, the timer 152 being connected to inputs of gates 142 and 146, the timer 153 being connected to inputs of gates 143 and 147 and the timer 154 being connected to inputs of gates 144 and 148. Reset signals are applied to the timers 151–154 from the sequence circuit 149, through lines 155–158, respectively. Control voltage signals are applied to the timers through lines 159 and 160. Line 159 is connected to the output of a conditioning circuit 161 having an input connected to a tachometer circuit 162 the input of which is connected to the exitation and conditioning circuit 150 to receive index pulses therefrom. Line 160 is connected to the output of a conditioning circuit 163 having an input connected to a "MAP" circuit 164. Circuit 164 senses intake manifold pressure and is arranged to develop a signal proportional to manifold absolute pressure. The conditioning circuits 161 and 163 correct for non-linearities in the relationship between optimum fuel flow and engine speed and engine manifold absolute pressure. A wide open throttle switch 165 may be connected to both conditioning circuits 161 and 163 to cause an appropriate change in the signals applied to the timer circuits 151–154 and to thereby cause an appropriate increase in the times of opening of the valves, when the throttle is fully open.

A fuel inhibit circuit 167 has inputs connected to the tachometer circuit 162 and to a closed throttle switch 168 and an output connected to all of the gates 141–148, the circuit 167 being operative in response to a predetermined deceleration of the engine, to reduce or cut off the flow of fuel.

Figure 8:
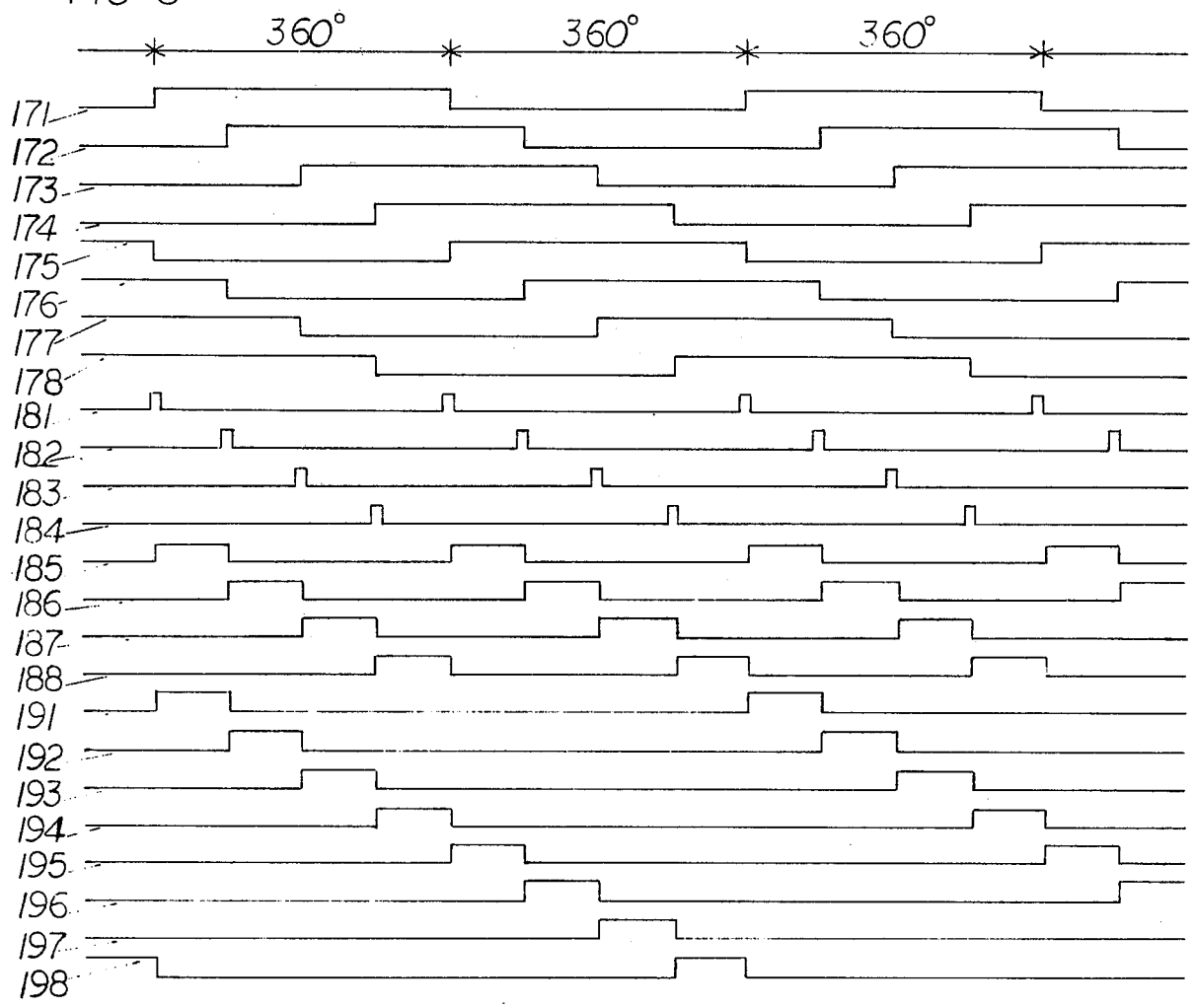
FIG. 8 is a wave form diagram for explanation of the operation of the system of FIG. 7.

FIG. 8 illustrates wave forms for explanation of the operation of the system 120 of FIG. 7. Wave forms 171–178 are of the signals generated by the sequence circuit 149 and respectively applied to inputs of the gates 141–148. Each of such signals is "high" for a full 360 degrees of crankshaft rotation, and then "low" for the next 360 degrees of crankshaft rotation, and so on. Each signal is delayed by 90 degrees in phase from the preceding signal.

Wave forms 181–184 are of the reset signals applied from sequence circuit 149 to the timers 151–154 through lines 155–158 and wave forms 185–188 are of the outputs of the timers 151–154 during a typical operating condition. Each timer is triggered every 360 degrees of crankshaft rotation, the triggering of each timer being delayed 90 degrees in phase from the triggering or resetting of the preceding timer.

Wave forms 191–198 are of the signals applied to the injector valves 121–128 when the timer signals 185–188 are applied. In effect, wave form 185 is combined, with an "AND" function with wave form 171 to develop a wave form 191 and is combined with the wave form 175 to develop the wave form 195. Similarly, wave form 186 is combined with wave form 172 to develop the wave form 192 and is combined with wave form 176 to develop the wave form 196, and so on. It will be noted that with the use of the sequencing signals as illustrated and with the use of the four timers 151–154, each injector valve may be opened for a time interval varying from zero to nearly 360 degrees of crankshaft rotation.

Figure 9:
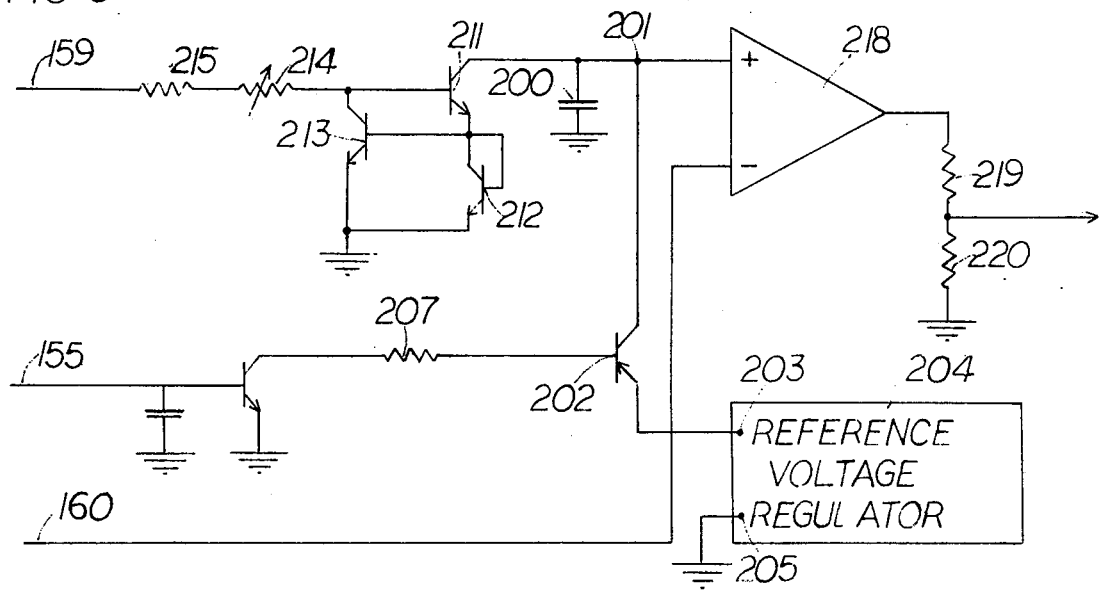
FIG. 9 is a circuit diagram of a timer usable in the system of FIG. 7.

FIG. 9 is a circuit diagram of the timer 151, the circuits of the other timers 152–154 being identical. A capacitor 200 is provided, connected between a circuit point 201 and ground. Circuit point 201 is connected to the collector of a transistor 202 having an emitter connected to a positive output terminal 203 of a reference voltage regulator 204 having a negative terminal 205 connected to ground. The reference voltage regulator 204 may, for example, supply a regulated voltage of 8.5 volts to the emitter of transistor 202 and the same reference voltage regulator 204 may be connected to the corresponding transistors of the other three timer circuits 152–154 to apply the same voltage thereto. The base of the transistor 202 is connected through a resistor 207 to the collector of a transistor 208 having a grounded emitter and having a base connected through a capacitor 209 to ground and connected through the reset line 155 to the sequence circuit 149. When a reset pulse is applied through line 155 to the base of the transistor 208, the transistor 208 is rendered conductive to render the transistor 202 conductive and to charge the capacitor 200 to a voltage substantially equal to the output voltage of the reference voltage regulator 204. The reset pulse may, for example, have a duration of 100 microseconds.

After being charged to the reference voltage during the reset pulse time interval, the capacitor 200 is discharged at a linear rate through a current sink 210, the linear discharge rate being controlled by the control voltage supplied through line 159. The current sink 210 comprises three transistors 211, 212 and 213. The collector of the transistor 211 is connected to the circuit point 201 while the emitter thereof is connected to the collector and base of the transistor 212 and the base of the transistor 213, the emitters of transistors 212 and 213 being grounded. The base of the transistor 211 and the collector of the transistor 213 are connected together and through an adjustable resistor 214 and a fixed resistor 215 to the line 159.

In operation, the transistors 211–213 function to maintain a constant discharge current, determined by the magnitude of the control voltage applied on line 159. If, for example, the discharge current, flowing through transistors 211 and 212, should tend to increase, it would tend to increase the base-emitter current through transistor 213, thereby tending to increase the current through transistor 213 and reducing the voltage applied to the base of the transistor 211, to thus oppose any increase in current. With transistors of properly selected characteristics, the discharge current is maintained constant to within very close limits and at a value directly proportional to the control voltage applied through line 159. Resistor 214 may be adjusted to adjust the ratio between the control voltage and the rate of change of the voltage at the circuit point 201 and to insure that all four timer circuits will have the same characteristics.

A trigger circuit is provided to sense the lowering of the voltage across the capacitor 200, i.e. the voltage at the circuit point 201, below the control voltage applied on line 160. In particular, a differential amplifier 218 is provided having one input connected to the circuit point 201 and a second input connected to the line 160 and having an output connected through resistors 219 and 220 to ground, the junction between resistors 219 and 220 forming an output terminal and being connected to the appropriate gates, (the gates 141 and 145 in the case of the timer circuit 151). In operation, when the reset pulse is applied on line 155, charging capacitor 200 to the reference voltage, the voltage at circuit point 201 is greater than that of the control voltage on line 160, causing the output of the differential amplifier 218 to be at a high level. The voltage at circuit point 201 decreases linearly with time, at a rate proportional to the control voltage on line 159, and when the voltage at circuit point 201 is less than the voltage on line 160, the amplifier 218 rapidly switches to a condition in which no output voltage is produced.

The duration of the signal generated by the timer 151 is thus proportional to the product of the control voltages applied on lines 159 and 160, a multiplying function being performed by the timer circuit.

It is noted that the details of the conditioning circuits 161 and 163 are not, in and of themselves, part of the present invention and they are therefore not illustrated but it is important to note that the operation of each of the conditioning circuits is preferably non-linear in a manner to obtain the optimum supply of fuel during all operating conditions. Because of the linear operation of the timer circuitry, it is not necessary to take into account any possible non-linearities in the operation of the timer circuit, in the design of the conditioning or computing circuits. Furthermore, each of the timer circuits may be adjusted, as by adjustment of the resistor 214, to obtain a predetermined relationship between the control voltages and the duration of the timing interval, it is not necessary to use expensive precision components and the manufacturer of systems of identical overall characteristics is made relatively simple with a substantial reduction in expense.

It will be understood that modifications and variations may be effected without departing from the spirit and scope of the novel concepts of this invention.

What is claimed is:

1. A fuel injection control system for an engine including a plurality of cylinders and fuel injection valve means associated with each cylinder for injection of fuel for flow into each cylinder during the intake stroke thereof and electrically energizable actuator means for each of said injector valve means, said control system comprising: first and second control voltage means for supplying first and second control voltages, one of said first and second control voltages being responsive to engine speed and the other of said first and second control voltages being responsive to engine intake manifold pressure, means for supplying timer triggering signals in predetermined phase relation to intake strokes of the engine, timer means comprising a timer circuit, controlled by said control voltages and controlled in response to one of said triggering signals to develop an output signal after a time interval having a duration varying as a linear function of the magnitude of each of said control voltages, and means coupled to one of said actuator means and arranged for operating in predetermined phase relation to said one of said triggering signals to effect opening of one of said injector valve means and for operating in response to said timer output signal to effect closing of said one of said injector valve means, said timer circuit including a ground terminal at a reference potential, capacitance means having a first terminal connected to said ground terminal and having a second terminal, a regulated voltage source having a first terminal connected to said ground terminal and having a second terminal maintained at a fixed potential relative to said ground terminal, transistor means connected between said second terminal of said capacitance means and said second terminal of said regulated voltage source, means connecting said transistor means to said timer triggering signal supplying means for rendering said transistor conductive in response to one of said triggering signals to fix the voltage between said first and second terminals of said capacitor means at a value substantially equal to said fixed potential, capacitor charge control means having first and second terminals respectively connected to said ground terminal and said second terminal of said capacitor means and having an input line connected to said first control voltage means, said capacitor charge control means including a controllable current sink operative to discharge said capacitor means at a linear rate controlled by the first control voltage applied between said input line and said ground terminal, and a trigger circuit having a first input connected through an input line to said second control voltage means and having a second input connected to said second terminal of said capacitor means, said trigger circuit being triggered from one state to another to develop said output signal when the potential of said second input thereof drops below the potential of said first input thereof.

2. In a fuel injection control system as defined in claim 1, said controllable current sink including a first transistor having base, emitter and collector electrodes, means including impedance means coupling said emitter and collector electrodes to said first and second terminals of said capacitance means, resistance means coupling said base electrode to said input line of said capacitor charge control means, and means including a second transistor responsive to the voltage across said impedance means for controlling the resistance between said base electrode and said ground terminal.

3. In a system as defined in claim 2, said collector electrode of said first transistor being connected to said second terminal of said capacitance means, and said impedance means being connected between said emitter electrode of said first transistor and said ground terminal.

4. In a system as defined in claim 3, said second transistor having a collector electrode connected to said base electrode of said first transistor, a base electrode connected to said emitter electrode of said first transistor and an emitter electrode connected to said ground terminal.

5. In a system as defined in claim 4, said impedance means comprising a third transistor having base and collector electrodes connected together and to said emitter of said first transistor and having an emitter electrode connected to said ground terminal.

6. In a system as defined in claim 1, said trigger circuit including a differential amplifier having a first input connected to said second terminal of said capacitance means and having a second input connected to said input line of said trigger circuit.

* * * * *